United States Patent [19]
Withers et al.

[11] Patent Number: 6,051,167
[45] Date of Patent: Apr. 18, 2000

[54] PROCESS OF MAKING CARBON-CARBON COMPOSITES

[75] Inventors: James C. Withers; Raouf O. Loutfy; Witold Kowbel; Calvin Bruce; Ranji Vaidyanathan, all of Tucson, Ariz.

[73] Assignee: Materials and Electrochemical Research (MER) Corporation, Tucson, Ariz.

[21] Appl. No.: 09/007,573

[22] Filed: Jan. 15, 1998

Related U.S. Application Data

[60] Provisional application No. 60/050,715, Jun. 24, 1997.

[51] Int. Cl.[7] ............................... C01B 31/02; D01F 9/12
[52] U.S. Cl. ...................... 264/29.2; 264/29.6; 264/81; 264/82; 423/447.7; 427/249.2; 427/249.3; 427/249.4; 427/249.15; 427/249.16
[58] Field of Search .................................. 264/29.2, 29.6, 264/81, 82; 423/447.7; 427/249.2, 249.3, 249.4, 249.15, 249.16

[56] References Cited

U.S. PATENT DOCUMENTS

| | | |
|---|---|---|
| 3,580,731 | 5/1971 | Milewski et al. . |
| 3,808,087 | 4/1974 | Milewski et al. . |
| 4,902,453 | 2/1990 | Okura et al. . |
| 5,206,085 | 4/1993 | Nakagawa et al. . |

FOREIGN PATENT DOCUMENTS

| | | |
|---|---|---|
| 714869A2 | 6/1996 | European Pat. Off. . |

OTHER PUBLICATIONS

Kowbel W. et al. "Applications of Net–Shape Molded Carbon–Carbon Composites in IC Engines". Journal of Advanced Materials, vol. 27, No. 4 (1996), pp. 2–7.

Kowbel W. et al. "Properties of C/C Composites Produced in One Low Cost Manufacturing Step". Carbon, vol. 34 (1996), pp. 819–821.

Kowbel W. et al. "Low Cost C/C Composites for Cylinder Liners". Carbon, vol. 35 (1997), pp. 1201–1203.

*Primary Examiner*—Leo B. Tentoni
*Attorney, Agent, or Firm*—Jerome M. Teplitz

[57] ABSTRACT

A carbon composite structure, for example, an automotive engine piston, is made by preparing a matrix including of a mixture of non crystalline carbon particulate soluble in an organic solvent and a binder that has a liquid phase. The non crystalline particulate also contains residual carbon hydrogen bonding. An uncured structure is formed by combining the matrix mixture, for example, carbon fibers such as graphite dispersed in the mixture and/or graphite cloth imbedded in the mixture. The uncured structure is cured by pyrolyzing it in an inert atmosphere such as argon. Advantageously, the graphite reinforcement material is whiskered prior to combining it with the matrix mixture by a novel method involving passing a gaseous metal suboxide over the graphite surface.

84 Claims, 1 Drawing Sheet

PROCESS OF MAKING CARBON-CARBON COMPOSITES

This application claims the benefit of U.S. Provisional Application Ser. No. 60/050,715, filed Jun. 24, 1997.

This invention was made in part with US Government support under Small Business Innovative Research (SBIR) NASA contracts. The Government under the SBIR Program has certain rights in the invention.

This invention relates to improved methods for making carbon composite matrices and structures and to improved matrices and structures made by such methods.

BACKGROUND OF THE INVENTION

Carbon—Carbon (C—C) composites are a specialty class of materials having many unique properties making them attractive for a variety of demanding engineering applications. Similar to many other high-performance composites, C—C composites consist of a continuous fiber reinforcement (graphite fiber) held within a matrix phase (carbon). Unlike other composites, both the reinforcement and matrix phases consist of essentially pure carbon. Demonstrated desirable properties of C—C composites are very lightweight (1.4–1.9 g/cc), low coefficient of friction, good fatigue and shock resistance, moisture resistance, no outgassing, good biocompatibility, radiation resistant, low coefficient of thermal expansion (anisotropic in most cases), excellent strength retention versus temperature, does not melt or soften to mention some of its properties. Undesirable properties include anisotropicy in thermal expansion, oxidation above about 425° C., low interlaminar strength in two-directional (2-D) composite construction using graphite fabric reinforcement and very high cost of manufacture. These undesirable properties have largely limited major applications of C—C composites. Each of these limitations must be overcome for widespread applications.

In aerospace applications such as the space shuttle, missile nose tips and rocket nozzle throats, C—C composites have found applications in spite of the property limitations and high cost which ranges from a few hundred dollars per pound to as much as $15,000/lb. For C—C composites to achieve success outside the specialty applications, their cost of manufacture must be substantially reduced. The high cost of C—C composites is directly related to the lengthy processing times and energy intensive manufacturing procedures used to make component shapes. Raw materials of graphite fibers (depending on the fiber type) and resin or pitch matrix precursors cost are generally relatively low. The matrix infiltration and densification processes are both time consuming and energy intensive, and therefore, costly.

There are several reinforcement architectures used in state-of-the-art C—C composites. The most often architecture is woven graphite fabric laid-up as laminates (2-D). There are also 3-dimensional and 4-dimenstional woven structures that are considerably more expensive than cloth or fabric weaves. Other reinforcement architectures include multifilament threads referred to as tows, chopped discontinuous tows or fabrics, felts and other discontinuous reinforcement forms. Regardless of the reinforcement architecture, the C—C composites are produced by resin or pitch impregnation followed by cure (thermosetting) and pyrolysis. Since the carbon yield from resins or pitches is generally limited to less than 50–70%, multiple cycles of impregnation and pyrolysis is required as practiced, prior to the present invention, to achieve a reasonable density (low porosity) composite, the density of the composite is directly related to the composite mechanical properties. In the prior methods to reduce the porosity, reimpregnation followed by further pyrolysis with the cycle repeated up to eight times is required to reduce the porosity to an acceptable level of under 10%. However, typically the matrix precursors pyrolize to result in closed porosity which cannot be reimpregnated and with these prior methods it is nearly impossible to produce a C—C composite with a porosity of less than about 20–15%, even with repeated reimpregnations.

The high cost of C—C composites are directly related to the hand lay-ups of 2-D composites to near net-shapes and the multiple matrix densification cycles often requiring 4–6 cycles. The laminates are characteristically thicker and subsequently heavier than required to carry-in-plane loads because the 2-D woven laminates have relatively low (a few hundred psi) interlaminar shear and cross-ply strengths. Thus, the parts must be thicker to maintain the interlaminar stresses below the allowable stress levels which adds to both the materials and manufacturing costs. Some approaches to overcome the interlaminar strength limitations is to utilize braiding, knitting or cross stitching, which is expensive and is known to degrade the graphite fibers in the 2-D orientations from the abrasion as well as reduce overall composite fiber loading and in-plane properties. Multidirectional 3-D, 4-D, etc. architectures improve interlaminar properties but are substantially more expensive to weave and the structures are processed as billets followed by extensive machining resulting in very expensive finished components.

In order to achieve a universal application of C—C composites, a significantly more cost effective fabrication process must be demonstrated that produces acceptable mechanical properties and particularly overcomes the low interlaminar properties of the 2-D type composites. To achieve these objectives, the fabrication processing must produce a net shape without the use of labor intensive hand lay-ups, only one impregnation-cure-pyrolysis densification step is permissible that produces a high composite density (low porosity) with mechanical properties that carry the loads in the intended application, the interlaminar shear is at least a factor of two above state-of-the-art 2-D C—C composites, and the anisotropicy is virtually eliminated. These are formidable objectives which have been attempted by many others heretofore without success in the aggregate or in combinations. As will become obvious, the instant invention achieves these objectives for C—C composites that can lead to widespread applications such as components in internal combustion engines; for example, pistons or thin plates for thermal management.

One of the most formidable obstacles is one-step net shape molding without labor intensive operations. Comparatively, economical net shape one-step molding is accomplished with discrete metal or ceramic particles, or chopped fiber glass. These reinforcements are mixed with a resin binder and net shape molded in a state-of-the-art segmented die, shaped bladder, autoclave, etc. with curing in the die. Such molding is not possible with continuous graphite fibers, 2-D woven cloths or 3-D type architectures as the fibers buckle and become askew resulting in very poor mechanical properties. This is the reason labor intensive hand lay-ups have been utilized. Discontinuous or chopped graphite fibers have been utilized to produce composites analogous to chopped fiber glass which can be economically one-step molded to net shape. However, traditionally discontinuous graphite fiber C—C composites have resulted in very poor mechanical properties of one-fourth or less than 2-D fabric composites. As an example, U.S. Pat. No. 4,683,809 column 3, line 47, reports 8ksi (55 MPa) strength for random oriented composites. Such results have been similarly obtained by the applicants, and in commercial literature, for example, 10–80 ksi, even lower mechanical properties are reported for discontinuous graphite. Generally, there are no discontinuous graphite fiber reinforced C—C composites utilized in commercial applications because of the poor mechanical properties. Thus, although economical net shape molding of discontinuous reinforcements could be utilized to alleviate labor intensive hand lay-ups, mechanical properties are insufficient to permit commercial utilization.

Even though net shape molding can be economically achieved by known techniques using discontinuous graphite fibers and a resin or pitch binder or even small pieces of impregnated cloth cut into geometries of, for example, ¼×1 inch, ½×½ inch, etc., when the binder/carbon matrix precursor is pyrolyzed, the carbon yield is sufficiently low that a porous low density matrix results along with unacceptably low mechanical properties. The composite density of a 50 vol % graphite fiber–50 vol % matrix composite will generally be much less than 1.4 g/cc due to porosity in the matrix as a consequence of low carbon yield of the resin or pitch matrix precursor.

To overcome this low density/high porosity matrix, several reimpregnations and pyrolysis steps are required to increase the density to acceptable values of 1.5–1.8 g/cc, which substantially improves the mechanical properties. To increase the carbon yield of the resin or pitch, attempts in the past have included adding various fixed carbon such as carbon black particulates, calcined cokes or graphite powder. A problem from such additives is an increase in the viscosity of the liquid resin or pitch resulting in poor impregnation of the matrix precursor. It is also common that after pyrolysis, the matrix is poorly bonded and powdery as a result of the fixed carbon additives and particularly carbon black. This is in part due to the high surface area of carbon black particulates. Another problem is the graphite reinforcement is typically 7 to 10 micron fibers in the form of tows or fabric architectures and the particulate fillers do not penetrate the fiber tow bundles or fabrics. Thus porosity remains in the fiber tows or fabrics including their interticies after pyrolysis resulting in poor mechanical properties.

An alternative to increasing the carbon yield of any organic is to reduce volatilization during pyrolysis, that is prevent carbon species from evaporating during pyrolysis. If an overpressure is utilized, then the vapor pressure of any volatile component is reduced. If, for example, the carbon yield of a phenolic resin were 60% under atmospheric pressure, if the pressure were increased to above atmospheric, then the carbon yield should increase to above 60%. The higher the pressure, the higher the carbon yield up to the point that only hydrogen would be lost from the hydrocarbon.

Certain organic structures in a resin/polymer results in less hydrocarbon loss than other structures. For example, polyaryacetylene (PAA) has a higher char yield of 75–90% depending on heating rate and surface area. The volatile loss in PAA is only methane and hydrogen which accounts for higher char yields. The effect of the organic composition and structure of the resin as well as pressure of pyrolysis and heating rate can have a direct and substantial effect on char yield that directly effects the residual porosity of the carbon matrix.

An alternative process of producing C—C composites is the pyrolysis of a hydrocarbon gas in a graphite reinforcement array which is called chemical vapor infiltration (CVI). The CVI process entails isothermally pyrolizing a hydrocarbon gas in the reinforcement array, creating a thermal gradient in the reinforcement array to pyrolize the hydrocarbon gas and build up the carbon matrix or forced flow of the hydrocarbon gas through the reinforcement array to build up the carbon matrix. A disadvantage of the variations of the CVI process is it is very slow requiring many hundreds of hours to build-up the carbon matrix, small pores are filled in preference to large pores and the deposition of the carbon seals off pores resulting in 30 to 10% porosity. A major disadvantage is that the surface deposition forms a continuous layer sealing off and leaving a porous core. To overcome this disadvantage typically only regular shaped parts are produced such as brake linings which are machined on the surface to open the pores followed by additional deposition. The machining to open pores and redeposition cycle is often repeated up to five or six times which is quite similar to the resin or pitch reimpregnation process. Thus, in the prior art method it is difficult to produce a C—C composite with less than 15–10% porosity which if achieved requires surface machining and reimpregnation.

One of the major limitations in C—C composite applications in addition to residual porosity is poor interlaminar shear strength. Much work has been reported in the art on graphite fiber surface treatment and composite processing to improve the interlaminar properties of shear and tensile strength. In general, very little success has been achieved for improving the interlaminar properties. An approach to increasing interlaminar properties in C—C composites is to whiskerize the graphite fiber reinforcement. Whiskers growing off the surface of a graphite fiber acts like a barb and prevents shear failure at the graphite fiber interface. The whiskerizing can also alter the surface chemistry of the graphite fiber that can affect the interlaminar shear properties of C—C composites. Whiskerizing graphite reinforcements has been known in the art but after whiskerizing the strength of the graphite fiber was reduced to such a low level it would be unusable to produce composites. Whiskerizing has typically involved producing silicon carbide whiskers.

It is known that gaseous silicon oxygen compounds react with carbon to produce silicon carbide and carbon monoxide. The temperature, pressure and concentration of reactants determine whether a solid carbon surface is converted to a layer of silicon carbide, whiskers are nucleated on the surface of the carbon or silicon carbide. Various methods of generating silicon oxide gases such as $SiO_{2(g)}$ of $SiO_{2(g)}$ are utilized to react with carbon bodies to form a silicon carbide layer. Such reactions are widely utilized to produce oxidation resistant coatings on carbon objects, and many attempts have been reported to convert graphite fibers to silicon carbide fibers. Utilizing the teachings of U.S. Pat. Nos. 3,459,504; 3,385,723; 3,447,952; 3,371,995; 3,269,802; 4,900,531; 6,634,116; 4,596,741; 4,554,203; 4,476,178; 4,481,179; 4,513,030; 3,580,731 and GB 2,147,891A graphite fibers converted to silicon carbide had unusable strengths and were, in some cases, severely cracked whether a thin silicon carbide layer was formed or the entire cross sections of the graphite fiber was converted to silicon carbide. Although the teachings from heretofore produced silicon carbide surfaces and/or silicon carbide whiskers, the product was unusable because of its very low strength. For example, T300 graphite fiber from Hercules as received has a tensile strength of 3–5 GPa and its diameter is approximately 7 microns. After converting to silicon carbide, the average tensile strength was less than ½ GPa, which is so low that it is unusable. T300 graphite fiber was whiskerized as taught in U.S. Pat. No. 3,580,731 and the strength of the whiskerized fiber was also less than ½ GPa and in some cases, unhandable with a strength less than 0.1 GPa. Even if only 10% of the cross section of the T300 fiber is converted to silicon carbide, the strength of the resultant fiber is less than 1 GPa and in some tests, less than ½ GPa, which is too weak for any reasonable application. Other commercially available graphite fibers from polyacrynialnitriel (PAN) and pitch were equally degraded when subjected to conversion to silicon carbide and/or whiskerization utilizing state-of-the-art teachings.

OBJECTS AND ADVANTAGES OF PRESENT INVENTION

It is an object of the present invention to provide a novel method for making improved carbon composite structures that offers the advantage of requiring less time and labor to produce, thereby reducing the ultimate cost.

It is another object of the present invention to provide improved methods for making carbon composite structures that are fabricated by impregnation of reinforcement structures and pyrolysis of the impregnated reinforcement structures and pyrolysis of the impregnated structure to eliminate or reduce the need for successive repeated reimpregnation and pyrolysis steps to achieve an acceptable porosity level in the final cured carbon composite structures.

It is a further object of the present invention to provide a method of making improved carbon composite structures containing carbon reinforcement structures that are whiskerized to enhance their usefulness and to provide improved methods for whiskerizing carbon fiber without materially reducing the tensile strength of the graphite fibers.

It is a still further object of this invention to provide improved matrix mixtures suitable to impregnate reinforcement structures, such as graphite cloth for achieving the foregoing objects in making improved carbon composite structures.

These and other objects and advantages will be clear to one skilled in the art upon reading the detailed description to follow.

SUMMARY OF THE INVENTION

The present invention, is concerned with a method of making a carbon composite structure containing reinforcement therein, which preferably comprise graphite fibers.

The invention involves the preparation of an improved matrix comprised essentially of a mixture of a non crystalline carbon particulate that is soluble in an organic solvent and a binder comprised of an organic carbon precursor that has a liquid phase and wherein the non crystalline carbon particulate is further characterized as containing residual carbon hydrogen bonding.

The prepared matrix mixture is combined with the reinforcement materials to form an uncured structure containing the reinforcement.

The uncured structure is subjected to heat under non oxidizing, pyrolyzing conditions to produce the desired carbon composite structures which, for example, may be a piston for an internal combustion engine or a sheet or other shape for thermal management.

In a preferred embodiment the reinforcement structure comprises graphite fibers.

Advantageously, the non crystalline carbon particulate of the matrix mixture should be chosen to have an average particle diameter of not more than one-half of the average diameter of the graphite fibers of the graphite reinforcement material.

The reinforcement may comprise discontinuous carbon particles imbedded in the matrix as a tow or cloth of graphite fabric to which the matrix mixture is applied to form the uncured structure to be cured by pyrolysis.

In a further object of the invention the carbon fibers of the reinforcement structures are whiskerized before being combined with the matrix mixture to form the uncured structures.

Advantageously, the whiskerizing is performed by a novel method of whiskerizing a carbon surface with a further aspect of the present invention wherein the carbon surface is contacted with a gaseous metal suboxide while maintained under conditions for conducting the reaction:

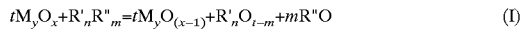

$$tM_yO_x + R'_nR''_m = tM_yO_{(x-1)} + R'_nO_{t-m} + mR''O \qquad (I)$$

where $M_yO_x$ is a standard metal oxide, R' and R'' are reductants to reduce the metal oxide to suboxides, and t, y, x, n and m are stoichiometric constants, R' and R'' can be either metals or carbon; accordingly, the corresponding $R'_nO_{t-m}$ and R''O can be different metal suboxides which would have the effect of producing a mixed carbide or could be carbon to produce carbon monoxide, whereby whiskerizing of the carbon surface is achieved without materially reducing the strength of the original graphite fiber upon which the whisker is produced.

In preferred embodiments of the invention, the matrix mixture of non crystalline carbon particulate and binder also includes an organic solvent, preferably in an amount chosen to dissolve a sufficient amount of the carbon particulate to produce a slurry.

In further embodiments the binder comprises a polymeric resin with at least 50% char yield.

In another embodiment the binder comprises pitch.

A further embodiment is that the non-crystalline carbon particulate has a particle size of two microns or less.

A further embodiment is that the non crystalline carbon particulate also has not been calcined to a temperature above 800° C. to assure residual volatiles that contains carbon hydrogen bonding.

In still another embodiment, the binder comprises a polymeric resin and pitch that are mixed and which contains an organic solvent that has dissolved at least partially therein a non crystalline carbon particulate that has carbon hydrogen bonding in the particulate.

In still another embodiment, a composite mixture is formed utilizing one of the embodiment teachings that achieves a matrix containing at least 10% open porosity which is then subjected to chemical vapor infiltration (CVI) that further reduces the porosity that constitutes a hybrid carbon matrix.

DETAILED DESCRIPTION OF THE INVENTION

Figure 1:
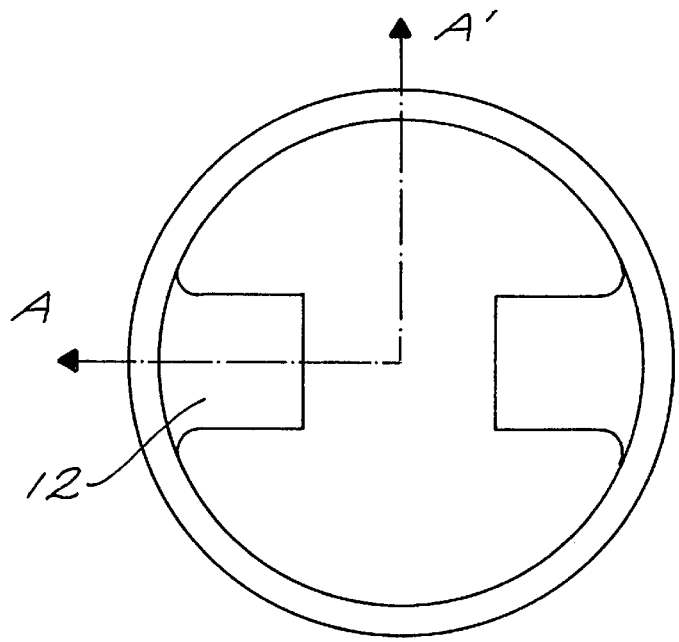
FIG. 1 is a schematic illustration of a bottom view of a typical piston for an internal combustion engine showing the wrist-pin area and constructed in accordance with the present invention.
Figures 1A, 1B:
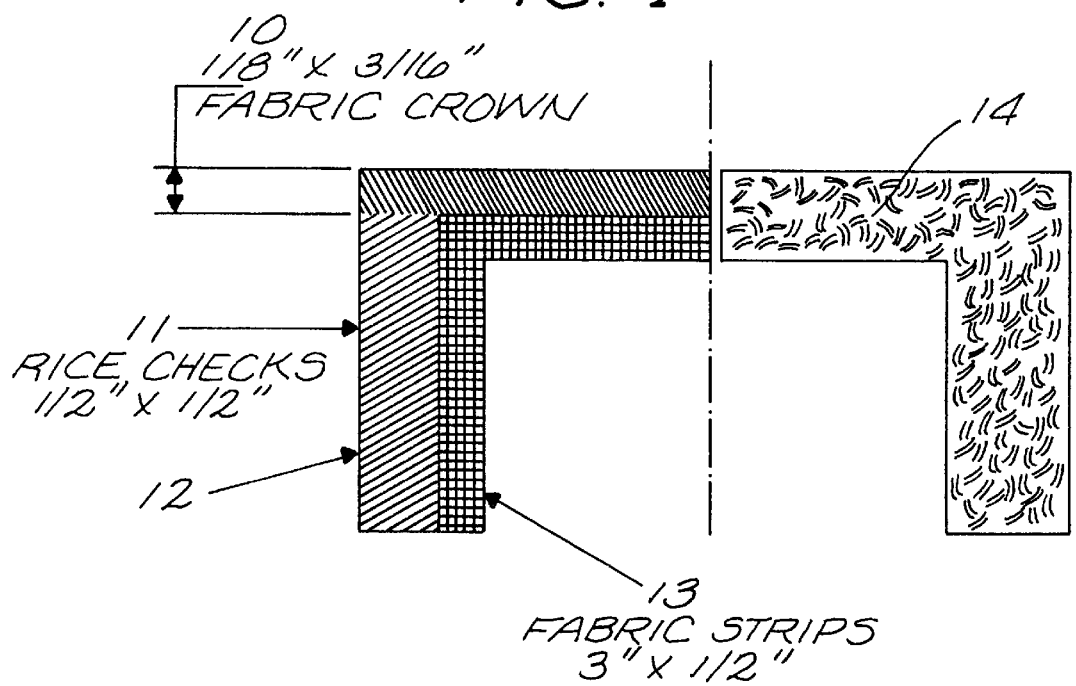
FIG. 1A is a cross-sectional, side view of a quarter section of a piston, as illustrated in FIG. 1, through lines A—A prime of FIG. 1, showing carbon fabric reinforcement material deployed in a matrix within the piston structure, in accordance with one embodiment of the invention.
FIG. 1B is a cross sectional, side view of a quarter section of a piston, as illustrated in FIG. 1, showing discontinuous graphite fiber reinforcement material deployed in a matrix within the piston structure, in accordance with another embodiment of the invention. This quarter section is the mirror image of section A—A prime, illustrated in FIG. 1A.

In FIG. 1A the crown is made of graphite fabric pieces that encompasses the entire diameter of the piston and constitutes the outer most surface as shown at 10. The remaining cross section of the crown is made up of fabric pieces 13 that also build-up the wrist-pin section 12 of the piston shown in FIG. 1. The area of the crown that was not covered by the fabric strips 13 is filled in with small fabric tabs also called rice checks 11 or discontinuous fibers 14. The side wall sometimes called skirt of the piston is made up of fabric tabs 11 or discontinuous fiber 14 that is not made-up of the fabric strips 13 in the wrist-pin cross sections as shown in the bottom view in FIG. 1. It is easily recognized by those in the state-of-the-art that the piston or other C—C components can be fabricated with a single reinforcement architecture or different reinforcement architecture to achieve a specific performance requirement. The composition of the precursor that form the carbon matrix in the C—C composite piston can be any of those described in the following examples or a hybride of resin or pitch precursors followed by chemical vapor infiltration (CVI) to produce the final carbon matrix material.

In accordance with the present invention, the problem of low porosity in the composite is overcome by the use of a liquid form of precursor that will penetrate the reinforcement architecture and which has a very high carbon yield to result in low porosity. In accordance with the instant invention processing has been discovered to achieve a liquid state matrix precursor that will yield well over 90% carbon on pyrolysis that results in well under 10% porosity in a C—C composite. The liquid matrix precursor will penetrate the graphite reinforcement architectures producing a low porosity matrix within the reinforcement as well as in the spaces between reinforcement.

In the instant invention it was discovered that select solvents will dissolve some fixed carbon materials which can be utilized to infiltrate graphite reinforcement architectures and the solvent evaporated leaving the very high carbon content material behind. If the carbon material is in fine particularate form preferably two microns or less, it is not necessary for it to be completely dissolved in the solvent. In the instant invention it was discovered that if the carbon particularate is at least less than about one-half the diameter of the graphite reinforcement and preferably two microns or less it is only necessary that the solvent solvate the carbon particularate to a few percent. Since most graphite fiber reinforcements are 7–10 microns in diameter the carbon particularate need be 3.5 to 5 microns diameter or less and in the instant invention particulate that is two microns or less produced superior composites.

In the instant invention a number of solvents and carbon materials were investigated, but are not intended to be all inclusive of either solvents or carbon materials, and other combinations may be possible to those skilled in the art which are nonetheless included in the teaching of the instant invention.

Carbon materials investigated include bottoms or residual known as resid, uncalcined petroleum coke sometimes referred to as green carbon coke from refinery operations and cokes from various other sources such as from steel mill operations, cokes from coal precursors including coal tar and synthetic organics that produce cokes or fixed carbons. The non-crystalline carbons defined herein are any carboneous material which contains residual volatiles wherein the volatiles are composed of a carbon-hydrogen bond and/or hydrogen. This generally means the non crystalline carbon has generally not been calcined or heat treated to above about 1000 to 1400° C. Non-crystalline carbons which have not been calcined to above 1400° C. and contain residual volatiles will have solubility to at least some extent in one or more types or classes of organic solvents. Thus, non crystalline carbons which have a fixed carbon content and are a part of the instant invention will possess one or more of the features of residual volatiles which contain a carbon-hydrogen bond and/or hydrogen, and (ii) has at least some solubility in one ore more types or classes of organic solvents.

A limited number of solvents that represents certain classes of hydrocarbon solvents such as alcohols, ketones, benzene ring compounds and solvents known to have a strong solvating ability for solids have been investigated. The solvents investigated included isopropyl alcohol as a low molecular weight alcohol, furfuryl alcohol as a high molecular weight alcohol, methyl ethyl ketone (MER) and 1-methyl-2-pyrrolidinone (NMP).

In the case of the fixed carbon components it is desirable to utilize as high a fixed carbon content as possible that will dissolve or partially dissolve in the solvent. For example, a tar might have only 30–60% fixed carbon and the 70–40% volatiles would dissolve in many solvents but would result in a porous carbon matrix due to the high volatiles content, yet a fully graphitized particle would have little to no solubility in a solvent and present difficulty penetrating a graphite fiber tow or fabric architecture unless the graphite particles diameter was less than about 3.5 micron and preferably less than about one micron which could then penetrate the reinforcement architecture.

Green carbon coke available from the petroleum industry is one of the most economical forms of carbon available which has a typical fixed carbon content of 80–85% and volatiles of approximately 20–15% depending on the temperature to which it has been exposed. A petroleum coke such as Asbury #4357 calcined to 1482° C. has reported carbon of over 99% with volatiles of less than ½%. When green carbon coke is calcined or heat treated in the absence of air the following weight losses were obtained.

TABLE I

Weight Loss/Residual Volatiles of Green Carbon Coke.

| Treatment Temperature ° C. | Weight Loss % | Calculated residual volatiles % |
|---|---|---|
| 800 | 6.5 | 6.5 |
| 1000 | 12.3 | 0.7 |
| 1400 | 12.6 | 0.4 |

After a calcination or heat treatment to 1000° C. there is only a minor amount of volatiles remaining but sufficient to contain some residual hydrogen and/or carbon-hydrogen bonding to achieve at least some solubility in select solvents.

The solubility of select carbons in select solvents is given in Table II.

TABLE II

Solubility in weight percent at room temperature of carbon product in given solvent

| Carbon Type | Solvent | | | | |
|---|---|---|---|---|---|
| | IPA | MEK | FA | Toluene | NMP |
| gcc as received | 2 | 4.3 | 28 | 1 | 94 |
| Asbury #4357 petroleum coke calcined to 1482° C. | 1.2 | 0.5 | 27 | 1 | 90 |
| Carbon black | Neg | Neg | Neg | Neg | Neg |
| Graphite | Neg | Neg | Neg | Neg | 29 |
| gcc 800° C. calcined | 2 | 14 | 18 | 3 | 10 |
| gcc 1000° C. calcined | 1.4 | 1 | 12 | 7 | 7 |
| gcc 1400° C. calcined | 3 | 3 | 13 | 3 | 3 |

IPA = isopropyl alcohol
MEK = methyl ethyl ketone
FA = furfuryl alcohol
NMP = 1-methyl-2-pyrrolidinone
gcc = green carbon coke
Neg = negiable Of course it is recognized if the solvent is heated the solubility of the carbon product will increase. For example, NMP whose boiling point is approximately 8° C./10 mm, was heated to 60° C. at atmospheric pressure and the solubility of the carbon product was found to be approximately double the solubility at room temperature. It was also discovered that the smaller the size of the carbon particulate the greater the amount that would solvate or be soluble in any given solvent.

The use of carbon products which have at least some solubility in a solvent mixed with a thermoset or thermoplastic matrix precursor can produce a very high carbon yield. The higher the carbon yield the lower the porosity in the residual carbon matrix. A commonly used synthetic resin to produce C—C composites is phenolic such as Borden Chemical Company B1008, which is a thermoset. When phenolic B1008 is applied to a graphite fabric and heated to produce a carbon matrix the char or fixed carbon yield is approximately 50% which is shown in Table III compared to the char yield of other formulations of the instant invention. Comparatively a high quality synthetic mesophase pitch, Mitsubishi AR, has a reported char yield of 70%. In combination with phenolic a char yield of 75% was achieved which is higher than either above. As seen in Table III as fixed carbon particulate is solvated and added to the resin the char yield increases significantly. The resin can be mixed with pitch and also containing the solvated carbon particulate with similar char yields.

TABLE III

| Matrix Precursor Compositions | Percent Char Yields |
|---|---|
| Phenolic | 50 |
| Phenolic - 25% petroleum coke* | 75 |
| Phenolic - 50% petroleum coke | 92 |
| PAA | 84 |
| PAA - 25% petroleum coke | 91 |
| PAA - 50% petroleum coke | 96 |
| Phenolic - 10% AR Pitch** 40% 2 micron gcc | 94 |

*petroleum coke calcined at 1482° C. 97% carbon
**Mitsubishi AR mesophase pitch

It is clear the char yield can be substantially increased through the use of matrix formulations that utilize fixed carbon which reduces the porosity in the final carbon matrix without the requirement of reimpregnation. However, if reimpregnation should be desirable or a requirement, it is imperative the porosity be of the open type. Thermoplastics typically result in a matrix micro structure which has more open porosity than thermosets which is known in the art and particularly phenolic to result in more closed porosity depending on pyrolysis protocol. The use of carbon particulate which has some solubility in a solvent with thermosets, produces a matrix with less closed porosity than the thermoset alone. Thus, if open porosity is desired in a C—C composite then formulations utilizing carbon particulate as well as thermoplastic ingredients or both are preferred.

To achieve the lowest possible porosity in a C—C composite the matrix formulation should utilize carbon particulate with a high fixed carbon content in a particle size at least ½ and preferably much less than ½ the diameter of the graphite fiber reinforcement and most preferably two microns or less, the carbon particularate utilized with a solvent that has at least some solubility for the carbon particularate in the solvent and in combination with a thermoset, thermoplastic or mixture of the two in which the char yield is above 90% and most preferably above 92–93%, but is in a liquid state to facilitate penetrating the graphite reinforcement tow or fabric architecture at the prepregging stage. Such a formulation wherein the solvent is evaporated during the consolidation stage of molding a graphite composite will produce a C—C composite with very low porosity in a single step without costly reimpregnation requirements to reduce matrix porosity. Low porosity matrix C—C composites result in higher composite properties such as strength, thermal conductivity, etc.

WHISKERIZING

In order to overcome the fiber strength degradation of silicon carbide conversion and/or growth of silicon carbide whiskers, it was found in the present invention that the kinetics of the silicon carbide formation reactions had to be quite slow. Rapid reactions that converted the surface of a graphite fiber to silicon carbide to a thickness greater than about 0.1 micron would result in severe strength degradation of the fiber. If whiskers were caused to grow during graphite fiber treatment in less than a few hours, the strength of the graphite fiber would be degraded such that it would have no value as a structural reinforcement.

There are several approaches to controlling the kinetics of the silicon carbide formation reactions. These include the reactants to produce the gaseous silicon oxide, the temperature of the reaction and the concentration or composition of the reactants in the gas phase, all which are interdependent. The volume change of various silicon gaseous compounds reacting with solid carbon is given in the following table.

TABLE IV

Molar Volume Change Caused by Reaction of Silicon with Carbons of Different Density to Produce SiC.

| Reaction | % Molar Vol. Change, Carbon at 1.9 g/cm$^3$ | % Molar Vol. Change, Carbon at 1.5 g/cm$^3$ | Carbon Density in g/cm$^3$ to Avoid any Molar Vol. Change |
|---|---|---|---|
| Si + C = SiC | +98 | +56 | 0.96 |
| SiO + 2C = SiC + CO | −1.2 | −22 | 1.92 |
| SiO$_2$ + 3C = SiC + 2CO | −34 | −48 | 2.88* |

*Maximum theoretical density of graphite is 2.2

This table illustrates the importance of careful control over the vapor species used to convert the carbon target to SiC, and the importance of the density of the precursor graphite material. Large molar volume increases are a result of the insertion of Si into the carbon structure without removal of additional carbon atoms, as exemplified by conversion using Si vapor. The result of this large increase in molar volume is a closure of the pores in monolithic carbon, substantially ending further reaction and fracture or cracking due to the large volume change as shown in Table IV. In the carbon fiber case, radial and longitudinal cracking results in the fiber yielding very low strength. At the other extreme, $SiO_2$ vapor leads to a substantial molar volume decrease due to removal of two carbon atoms for every atom of SiC formed. The result of this reaction is oxidation of the fiber or carbon structure leaving high porosity and a pitted and eroded surface. Fibers suffering these effects exhibit greatly reduced strengths and may be reduced to powder, while monolithic structures undergo an increase in porosity (decrease in density) and suffer substantial losses in strength.

The first step in the reaction to form SiC as a conversion of the carbon surface or to grow SiC whiskers on the surface consists of the following three steps:

1) Generation of the gaseous reactant species
2) Transport of the gaseous species to the reaction surface
3) Reaction with the target to produce SiC as a coating and/or whiskers.

The first step is the production of gaseous conversion species, of which metal suboxides are the preferred species for reasons given above. The generic reaction for generation of metal suboxide reaction species can be expressed as:

$$tM_yO_x + R'_nR''_m = tM_yO_{(x-1)} + R'_nO_{t-m} + mR'_nO_{t-m} \quad (1)$$

where $M_yO_x$ is a standard metal oxide, R' and R" are reductants to reduce the metal oxide to suboxides, and t, y, x, n and m are stoichiometric constants. R' and R" can be either metals or carbon; accordingly, the corresponding $R'_nO_{t-m}$ and $R'_nO_{t-m}$ could be different metal suboxides which would have the effect of producing a mixed carbide or could be carbon to produce carbon monoxide.

For the chemical vapor reaction to produce SiC, different reactants may be used according to the generic reaction, and will produce different gaseous species according to the reactants used and the thermodynamic conditions. Possible reactions to produce SiO vapor conversion species are:

$$SiO_{s(s)} + Si_{(s)} = 2\ SiO_{(g)} \quad (2)$$

$$SiO_{s(s)} + C_{(s)} = SiO_{(g)} + CO_{(g)} \quad (3)$$

In equation (2), M and R' are Si, t=1, y=1, x=2, and n=1, while in equation (3), M and R' are Si, R" is C and t,y,x,n, and m are 1, 1, 2, 1 and 1, respectively.

Once generated, the SiO gaseous reactant species is transported to the reaction site and reaction to produce a conversion surface occurs according to the following:

$$SiO_{(g)} + C_{(s)} = SiC_{(s)} + CO_{(g)} \quad (4)$$

If whisker growth on the carbon fiber or other surface is desired, the reaction consists of:

$$SiO_{(g)} + C_{(g)} = SiC_{(s)\ (whisker)}\ CO_{(g)} \quad (4a)$$

Reactions 4 and 4a can occur simultaneously or one can be pushed over the other by providing carbon in the gas phase such as methane or CO. The reaction with CO consists of $SiO_{(g)} + 2\ CO_{(g)} = SiC_{2\ (g)}$ (4b). It has been observed that CO additions improve whisker formation as well as reduce strength degradation of graphite fibers.

Although SiO is used as an example, in practice the gaseous reaction species may be any of several types depending on the type and ratio of reactants in the gas generator and the thermodynamic conditions. Exact control of the type and concentration of gas species in the reaction is critical in achieving control reaction of the target due to the large molar volume changes that can adversely affect the extent and type of reaction (SiC surface or SiC whiskers), or microstructure and the resultant strength of the carbon/SiC. This is particularly true in the case of fibers which in general have low porosity and are thus extremely sensitive to possible molar volume change in the final strength of the fiber. In addition to the equation for generating SiO as the reactant, two other possible vapor species may exist and can enter into the reaction to produce SiC via one of the following:

$$Si_{(g)} + C_{(g)} = SiC_{(s)} \quad (5)$$

$$SiO_{2(g)} + 3C_{(s)} = SiC_{(s)} + 2CO_{(g)} \quad (6)$$

It is likely that all of these reactants can occur simultaneously depending on the reaction conditions, which must be controlled in order to prevent strength degradation and to achieve consistent high strength in a graphite fiber with whiskers and/or surface reaction.

Other carbide whiskers can also be formed with the use of oxides or suboxides to generate the whiskers. For example, $B_2O_3$ or $B_2O_2$ will produce $B_4C$ whiskers. It is possible to produce whiskers of all carbide forming elements or mixed composition whiskers. If two or more reactants are utilized a mixed carbide whisker will be produced or both carbide whiskers produced.

EXAMPLES

1. A matrix precursor was prepared by mixing phenolic resin 1008 from Borden Company with isopropyl alcohol in a 1:1 ratio. Green carbon coke (gcc) was ground to less than 4 microns and mixed thoroughly with the phenolic-alcohol in a ratio of 1:1. Reinforcement material comprising ¼ inch long graphite fiber elements were then combined with the mixture of phenolic alcohol and carbon matrix. After mixing to disperse the reinforcement elements throughout the matrix, the alcohol was evaporated, which left a paste which was suitable for net shape molding in a closed die, bladder, autoclave, etc. A molding was made in the shape of a piston using a steel die and raising the temperature of the die to 185° C. to cure or fix the thermoset phenolic resin. The molded piston was removed from the die and pyrolyzed by heating in an inert atmosphere of argon gas (or a vacuum furnace can be used) to 870° C., thereby producing a C—C composite with a density that was determined to be 1.5 g/cc and a flexure strength of 50 MPa.

2. Example 1 was repeated and the molded piston was heated to a pyrolysis temperature of 1800° C. which produced a composite with a density of 1.6 g/cc and a strength of 80 MPa.

3. Example 2 was repeated using a commercial pitch termed AR from Mitshibitu, instead of the phenolic resin, which produced a composite with a density of 1.58 g/cc and a strength of 75 MPa.

4. AR pitch, as described in Example 3, was dissolved in NMP solvent to provide 40% pitch. Green carbon coke (gcc) ground to less than 2 microns was mixed thoroughly with the 40% pitch in a ratio of 1:1 based on carbon yield from the pitch. Discontinuous fibers of T300 at ¼ inch long was mixed with the 40% pitch to provide a 50% reinforcement based on carbon yield from the pitch. The solvent was evaporated until a paste was produced and which was then molded into a piston as in Example 1, followed by pyrolysis by heating to 1800° C., as in Example 2. The density of the pyrolized piston was determined to be 1.65 g/cc with a flexure strength of 90 MPa.

5. Example 1 was repeated using T300 ½ inch long discontinuous graphite fibers which had been whiskerized with SiC utilizing processing that did not materially reduce the strength of the graphite fiber. The final density of the pyrolyzed piston was determined to be 1.58 g/cc and the flexure strength was 100 MPa.

6. A matrix precursor consisting of a mixture of NMP solvent, AR pitch, phenolic resin and green carbon coke (gcc) particles of less than 3 micron diameter was utilized to provide 1:1 carbon ratio from pitch and phenolic to green carbon coke (gcc) to provide 1:1 ratio of carbon from pitch plus phenolic and the gcc. Discontinuous T300 fibers which had been whiskerized (without materially reducing the strength of the original graphite fiber) were added to the mixture to provide 50% fiber volume in a matrix carbonized state. Solvent was evaporated, until a paste was formed and which was then molded into a valve shape structure, followed by pyrolysis by heating to 1200° C. in an inert atmosphere of argon. The density of the composite was determined to be 1.62 g/cc with a flexure strength of 120 MPa.

7. Example 6 was repeated with the use of coke particles derived from pitch which had been calcined to 1200° C. and the particles in the size range minus 10 mesh plus 200 mesh which had been partially converted to SiC with SiC whiskers growing off the surface of the particles. The final C—C composite density was determined to be 1.6 g/cc with a flexure strength of 80 MPa.

8. Example 6 was repeated with the additional use of an organoboron compound, namely, a carborane (vinyl-o-carborane), which was mixed to yield 10% boron, (in addition to the whiskerized T300 fibers) based on carbon in the matrix which, after pyrolysis as described in Example 6, provided a 10% boron content in the matrix that was determined to have attributes of increased abrasion resistance due to some formation of boron carbide, as well as increased oxidation resistance. The density was determined to be 1.68 g/cc and the flexure strength was 150 MPa.

9. Example 8 was repeated with the use of polycarbosilane, instead of carborane, as an addition to the mixture description in Example 6, which provides SiC with its attendant attributes of hardness, abrasion resistance and oxidation resistance.

10. Example 9 was repeated with both vinyl-o-carborane (as in Example #8) and polycarbosilane (as in Example #9) added to give both boron and silicon and their carbides with their continued attendant attributes, particularly oxidation resistance due to the formation of a $SiO_2$—$B_2O_3$ mixture known to provide excellent oxidation resistance. These additives also increased the CTE of the composite which, in the case of a piston, provides a closer match to a metal cylinder wall liner.

11. Example 6 was repeated with the addition of very fine (3–5 micron) titanium powder, which, on pyrolysis, forms TiC with its attendant properties that, on oxidation, produces $TiO_2$, which is known to provide excellent tribological properties as well as increases the expansion of the composite and provide isotropicy.

12. Example 10 was repeated with the addition of titanium powder (along with the vinyl-o-carborane and polycarbosilane) to provide boron, silicon and titanium on pyrolysis.

13. An eight harness satin weave using 3K T300 fiber fabric architecture was whiskerized and impregnated by vacuum bag processing using the matrix precursor of Example 6 and cured to "B" stage, which is non-tacky. The fabric was cut into different geometries of ½ inch circles, ⅜x¾ inch rectangles and ½x½ inch squares. Each of these separate geometries was utilized to mold 85 mm diameter pistons followed by pyrolysis of these pistons to 1800° C., as described in Example 6.

14. Example 13 was repeated using the matrix precursor of Example 6 to impregnate both 1/2 inch squares as described in Example 6 of 3K T300 fiber fabric as described in Example 13 and for molding Example 5 was repeated to produce discontinuous whiskerized graphite fiber, to prepare a piston structure ready for molding. Approximately equal amounts of fabric squares and fibers were utilized to form this composite, which was cured and used to mold a piston that was subjected to pyrolysis, as in Example 13.

15. Example 14 was repeated with the mold filled with composite to provide fabric squares in the piston crown area and discontinuous fibers in the composite used in the skirt area.

16. Whiskerized "B" stage fabric was produced as in Example 13 and cut into 85 mm circles. These circles were stacked eleven deep in the piston mold to form the crown of the 85 mm diameter piston. Discontinuous whiskerized fiber as in Example 5, was placed in the mold to form the skirt and built-up wrist-pin areas and molded and pyrolyzed as in Example 1 to form a piston with a reinforcement material forming a continuous whiskerized graphite cloth crown and discontinuous whiskerized graphite fiber skirt.

17. Graphite powder in the size range of minus 10 mesh plus 325 mesh was mixed with chopped discontinuous graphite fiber ¼ inch long and whiskerized to prevent fiber strength degradation. The whiskerized carbon reinforcement material was mixed with 1:1 phenolic-gcc particles of less than two micron to provide a composition of 40% reinforcement—60% matrix after pyrolysis. This mixture was extruded, sometimes called pulitruded, into a skirt configuration of a piston with increased thickness for the pin connection. The cure stage was to the "B" stage. A crown area was produced using reinforcement material comprising graphite cloth cut to the diameter of the piston crown with a matrix of 1:1 phenolic-gcc and cured to the "B" stage under pressure. The "B" stage crown and "B" stage extruded skirt were placed in a mold and molded under pressure at 185° C. wherein the two parts easily joined to produce a single part piston which was then pyrolized to 1200° C. in an inert atmosphere of argon.

18. Example 17 was repeated and each preformed part of the piston, i.e., crown and skirt, was coated at the joint line with phenolic resin pitch mixture containing silicon, vinyl-o-carborane and titanium powder which during subsequent pyrolysis, provided a stronger bonding between the two parts that make up the finished piston component.

19. T300 3K 8HS fabric was heat treated at 1800° C. and then SiC-whiskerized using a $SiO_2$/Si generator at 1450° C. Carbon—carbon composites were made using the whiskerized fabric and the phenolic resin-derived carbon matrix described in Example 1. Initially, the carbon-polymer composites were molded at 185° C. and 1 ksi pressure. Subsequently, a 870° C. heat treatment was utilized to carbonized the phenolic matrix. Two reimpregnations with phenolic resin were used for the composite densification. High interlaminar shear strength (ILS) and interlaminar tensile strength (ILT) values of 35 and 15 MPa, respectively, were found.

20. A reference C—C composite was made using the same processing conditions described in Example 19 and only 1800° C. heat treated fabric was used (no SiC whiskers). The composite ILS and ILT values were 7 MPa and 5 MPa, respectively.

21. C—C composites were made using the T-300 1K fabric and the 50:50 green carbon coke/phenolic resin slurry described in Example 19 with the exception NMP solvent was used instead of isopropyl alcohol. Molding pressure of 5 MPa was used combined with a 0.3 hour soak time (at 85° C.) and a 0.3 hour ramp time during which the temperature was raised gradually(from 85° C. to 175° C.). The size of the green carbon coke varied from 7.5 to 2.5 micron. A pyrolysis temperature of 2500° C. was utilized. The resulting C—C composites exhibited a flexural strength of 350 MPa combined with no transverse cracking of the matrix. For a reference, the flexural strength of the state-of-the-art-C—C composite produced by C-CAT using six infiltration cycles (about 1 month processing time) is 180 MPa.

22. Bottoms from petroleum refining were calcined to 1000° C. which resulted in a residual volatile content of 10%. The calcined coke product was ground with 50% less than 4 microns. The 1000° C. calcined fine coke was mixed 1:1 with NMP solvent and stirred at 50° C. for one hour. The solvated coke NMP mixture was mixed with phenolic Borden Chemical Company 1008 and 20% AR pitch to produce a ratio of 40% fixed carbon from the coke and 60% carbon from the phenolic pitch mixture. This matrix precursor mixture was prepregged into a graphite tow containing 48,000 fibers. The tow was "B" staged and chopped into ½ inch length followed by molding into a flat sheet 3 mm thick and pyrolyzing to 1200° C. The resultant composite had a density of 1.76 g/cc and a strength of 190 MPa.

23. Example 22 was repeated with the addition of 1% borane to the matrix and without chopping the "B" stage tow. The molded sheet was pyrolyzed to 2500° C. The density was 1.99 g/cc and the strength was 450 MPa. An XRD pattern showed the carbon matrix to be completely crystallized to graphite.

24. C—C composite structures in the forms of valves and cylinder wall liners for internal combustion engines were produced using the procedures of each of Examples 6 through 16.

25. Green carbon coke particles were calcined to 800° C. and dissolved in methyl ethyl ketone (MEK) followed by adding a phenolic resin that is also soluble in MEK. The ratio of carbon was 1:1 derived from gcc and phenolic. The precursor of phenolic-gcc in MEK was used to apply to a graphite fabric by standard techniques of brushing, rolling or immersing to impregnate the fabric. The liquid precursor penetrated the graphite tow in the graphic fabric reinforcement material and was found to provide good carbon matrix distribution after subsequent pyrolysis. The MEK volatilized during heating leaving the gcc well dispersed along with the phenolic in the graphite fabric. The phenolic was "B" staged to light tackiness. The "prepregged" graphite fabric can be consolidated into a laminate by standard processing or cut into pieces for molding net shapes such as pistons, valves, etc. After molding a green composite and heating to 165° C. to cure the thermoset phenolic, the green component was pyrolyzed to 1200° C., thereby producing a carbon matrix. A sample of the phenolic-gcc was pyrolyzed concurrently and found to have a char yield of 92%. The final C—C composite had a density of 1.68 g/cc achieved in one single step of impregnation. The strain to failure rate of the cured carbon composite structure made by the process of Example 25, wherein the gcc was dissolved in MEK before being applied to the graphite fabric, was found to be twice the strain to failure rate of cured carbon composite structures that were made by mixing the gcc and phenolic without an organic solvent before applying the mixture to the graphite fabric.

26. Examples 1, 2, 5–19, 21–25 were repeated using polyarylacetylene(PAA) resin instead of phenolic.

27. A matrix precursor consisting of the thermoset phenolic with 50% green carbon coke and the matrix containing 0.25% carborane was applied to P30X graphite fabric reinforcement material and "B" staged to tackey. The uncured structure containing the fabric pieces were molded at 1,000 psi and heated to 165° C. for curing. The cured composite was pyrolyzed to 2300° C. which produced a density of 1.88 g/cc and it was shown with x-ray diffraction(XRD) that the matrix was fully graphitized and the thermal conductivity through the thickness of the component was 30 WmK.

28. Example 27 was repeated with a pyrolysis temperature of 3000° C. The density was 2.0 g/cc, through the thickness thermal conductivity was 40 WmK.

29. Example 28 was repeated using reinforcement material comprising P30X tow, producing a unaxial aligned composite. The density was 2.0 g/cc, through the thickness thermal conductivity was 44 WmK and the longitudinal thermal conductivity was 450 WmK.

30. Example 29 was repeated using a 6 to 1 fiber tow orientation. The properties were the same as example 29 except the longitudinal thermal conductivity was 400 WmK.

31. Example 25 was repeated in which the ratio of gcc was 70:30 phenolic which produced a composite with a density of 1.62g/cc and a flexure strength of 180 MPa.

32. Example 31 was repeated and the matrix precursor was applied to reinforcement material comprising T300 fabric 19×19 ends in a basket weave between two rollers. The rollers forced the slurry matrix into the tows of the fabric. The prepregged fabric was "B" staged and molded at 2,500 psi: into a sheet containing twelve plies with curing at 165° C. The green composite was carbonized to 1200° C. which resulted in a density of 1.72 g/cc and a flexure strength of 250 MPa.

33. Example 32 was repeated using an Asbury 4357 coke which has been calcined to 1200° C. and containing 0.4% volatile. The density was 1.68 g/cc and the flexure strength 290 MPa.

34. Asbury 4357 coke as in Example 33 was mixed in a 1:1 weight ratio with furfuryl alcohol and ball milled for six hours. A coal tar pitch designated 15V from Allied Chemical Corporation was crushed in small pieces and added to the ball mill. After another six hours the coal tar pitch had dissolved in furfuryl alcohol resulting in a slurry with the coke in which the coke was partially dissolved as given in Table II. This matrix precursor mix was painted onto graphite fabric and rolled between rollers. The matrix precursor was slightly tackey and was molded under vacuum while heating to 200° C. The molded composite was reheated in air to stabilize the pitch. The composite was pyrolyzed to 1800° C. The resultant composite had a density of 1.78 g/cc and a composite strength of 275 MPa.

35. A matrix precursor consisting of 50:50 PAA resin and gcc was applied to reinforcement material comprising a graphite fabric as in Example 32 and similarly composited. The carbonized composite had a density of 1.56 g/cc and a flexure strength of 190 MPa.

36. Example 35 was repeated using coke as in example 33. The composite density was 1.76 g/cc with a flexure strength of 295 MPa.

37. A matrix precursor of 50:50 non condensable phenolic and Ceraset preceramic polymer from DuPont Company was used to infiltrate a three dimensional preform of graphite reinforcement in the form of a rocket nozzle. Pyrolysis was conducted at 1400° C. in the presence of an inert atmosphere of argon. After three reimpregnations the porosity was less than 7%.

38. The matrix precursor of example 37 was applied to graphite fabric and molded into a composite as in example 32. The density was 2.2 g/cc with a flexure strength of 260 MPa.

39. Borden B1008 phenolic was heated to 135° C. which caused it to set or cure and expel most of the water during cross-linking. The cured phenolic was granulized into small particles and mixed with Ceraset resulting in a stable liquid. This mixed liquid was painted onto graphite cloth and run between rollers. The prepreg was heated with warm air and cured to a slight tackness. The "B" staged material was molded at 2,000 psi and heated to 185° C. that cured the thermoset Ceraset. The cured molded composite was pyrolized to 1400° C. in the presence of an inert atmosphere of argon. The resultant composite had a density of 2.6 g/cc and a strength of 300 MPa. It was found this composite was completely flame resistant using standard test.

40. Example 39 was repeated utilizing the coke of Example 33 mixed with NMP and the phenolic which was then cured to 135° C. The pyrolized composite density was 2.66 g/cc with a flexure strength of 330 MPa.

41. The method of whiskerizing graphite fiber without materially reducing the strength of the graphite fiber was performed by passing heated graphite fiber into a gaseous atmosphere of SiO to flash grow SiC whiskers onto the surface of the graphite fibers without substantial surface conversion to SiC which would degrodate the strength of the graphite fiber. The whiskerized graphite fiber tow was passed into a mixture of NMP solvent, two micron coke which had been calcined to 1000° C. and phenolic to produce a matrix ratio of 1:1 after pyrolysis. The tow was "B" staged and then cut into ¼ and ½ inch sections that were molded into a piston architecture with curing to 185° C. The molded piston was pyrolized to 1800° C. which resulted in a porosity of 13%. The piston was then subjected to chemical vapor infiltration (CVI) which reduced the porosity to 7%.

42. Example 11 was repeated with the addition of 10% aluminum titanitate which reduced the coefficient of thermal expansion to nearly isotropic at 0.5 parts per million per degree centigrade.

43. A formulation consisting of 1:1 phenolic (phenolic had 25% 1 PA) and coke particles was applied to fabric used in Example 32, cured under pressure of 2,500 psi to 185° C. and pyrolized in argon 1800° C. to demonstrate the effect of the particle size on composite strength.

| Carbon Particle Size | Strength after curing to 185° C. MPa | Strength after pyrolysis to 1800° C. MPa |
| --- | --- | --- |
| 10µ | 220 | 125 |
| 4µ | 350 | 175 |
| 2µ | 740 | 270 |

In this particular head to head comparison it is clear the smaller the particle size the greater the strength. The strength of the composite is also affected by graphite reinforcement type, solvent used to solvent the carbon particulate, molding and curing conditions, pyrolysis rate and pyrolysis temperature.

What is claimed is as follows:

1. The method of making a carbon composite structure that comprises the steps of:
    (a) preparing a matrix comprising a mixture of a non crystalline carbon particulate that is soluble in an organic solvent, a binder comprised of an organic carbon precursor that has a liquid phase, and an organic solvent which solvates and at least partially dissolves said non crystalline carbon particulate, thereby forming a solution of said non crystalline carbon and binder, wherein said non crystalline carbon particulate is further characterized by containing residual carbon hydrogen bonding;
    (b) forming an uncured structure by combining the mixture comprising said matrix with reinforcement material; and
    (c) curing the uncured structure by subjecting it to pyrolizing heat under non oxidizing conditions to thereby form said carbon composite structure.

2. The method of claim 1 wherein the reinforcement material comprises a plurality of discontinuous reinforcement elements dispersed in said matrix mixture.

3. The method of claim 1 wherein the reinforcement material comprises a continuous thread or tow immersed in said matrix mixture.

4. The method of claim 1 wherein the reinforcement material comprises both a plurality of discontinuous reinforcements elements dispersed in said matrix mixture and at least one continuous thread or tow embedded therein.

5. The method of claim 1 wherein the reinforcement material comprises a fabric that is impregnated with the matrix mixture.

6. The method of claim 1 wherein the reinforcement material comprises both a plurality of discontinuous reinforcement elements dispersed in said matrix mixture and a fabric that is impregnated with the matrix mixture having the reinforcement elements dispersed therein.

7. The method of claim 1 wherein the organic solvent is present in an amount chosen to form a slurry of said non crystalline carbon at least partially dissolved therein.

8. The method of claim 1 wherein the non crystalline carbon consists essentially of a partially calcined coke that includes chemical bonding to carbon atoms and which becomes gaseous at a temperature below 1200° C.

9. The method of claim 1 wherein the binder comprises a polymeric resin with at least 50% char yield.

10. The method of claim 2 wherein the binder comprises a polymeric resin with at least 50% char yield.

11. The method of claim 3 wherein the binder comprises a polymeric resin with at least 50% char yield.

12. The method of claim 4 wherein the binder comprises a polymeric resin with at least 50% char yield.

13. The method of claim 5 wherein the binder comprises a polymeric resin with at least 50% char yield.

14. The method of claim 6 wherein the binder comprises a polymeric resin with at least 50% char yield.

15. The method of claim 1 wherein the binder comprises pitch.

16. The method of claim 2 wherein the binder comprises pitch.

17. The method of claim 3 wherein the binder comprises pitch.

18. The method of claim 4 wherein the binder comprises pitch.

19. The method of claim 5 wherein the binder comprises pitch.

20. The method of claim 6 wherein the binder comprises pitch.

21. The method of claim 1 wherein the binder comprises a mixture of pitch and polymeric resin.

22. The method of claim 2 wherein the binder comprises a mixture of pitch and polymeric resin.

23. The method of claim 3 wherein the binder comprises a mixture of pitch and polymeric resin.

24. The method of claim 4 wherein the binder comprises a mixture of pitch and polymeric resin.

25. The method of claim 5 wherein the binder comprises a mixture of pitch and polymeric resin.

26. The method of claim 6 wherein the binder comprises a mixture of pitch and polymeric resin.

27. The method of claim 2 wherein the reinforcement material is comprised of graphite fibers.

28. The method of claim 3 wherein the reinforcement material is comprised of graphite.

29. The method of claim 4 wherein the reinforcement material is comprised of graphite.

30. The method of claim 5 wherein the reinforcement material is comprised of graphite.

31. The method of claim 6 wherein the reinforcement material is comprised of graphite.

32. The method of claim 1 wherein the reinforcement material is comprised of graphite.

33. The method of claim 7 wherein the reinforcement material is comprised of graphite.

34. The method of claim 8 wherein the reinforcement material is comprised of graphite.

35. The method of claim 9 wherein the reinforcement material is comprised of graphite.

36. The method of claim 10 wherein the reinforcement elements are comprised of graphite.

37. The method of claim 11 wherein the reinforcement material is comprised of graphite.

38. The method of claim 27 comprising the preliminary step of whiskering the graphite fiber reinforcement elements by forming carbide whiskers thereon.

39. The method of claim 28 comprising the preliminary step of whiskering the graphite reinforcement material by forming carbide whiskers thereon.

40. The method of claim 29 comprising the preliminary step of whiskering the graphite reinforcement material by forming carbide whiskers thereon.

41. The method of claim 30 comprising the preliminary step of whiskering the graphite reinforcement material by forming carbide whiskers thereon.

42. The method of claim 31 comprising the preliminary step of whiskering the graphite reinforcement material by forming carbide whiskers thereon.

43. The method of claim 32 comprising the preliminary step of whiskering the graphite reinforcement material by forming carbide whiskers thereon.

44. The method of claim 33 comprising the preliminary, step of whiskerizing the graphite reinforcement material by forming carbide whiskers thereon.

45. The method of claim 34 comprising the preliminary, step of whiskerizing the graphite reinforcement material by forming carbide whiskers thereon.

46. The method of claim 35 comprising the preliminary, step of whiskerizing the graphite reinforcement material by forming carbide whiskers thereon.

47. The method claim 38 wherein the carbide whiskers are formed on the graphite fibers by passing a gaseous metal suboxide over the graphite fiber to be whiskerized while maintained under conditions for conducting the reaction:

$$tM_yO_x + R'_nR''_m = tM_yO_{(x-1)} + R'_nO_{t-m} + mR''O$$

where $M_yO_x$ is a standard metal oxide, R' and R" are reductants to reduce the metal oxide to suboxides, and t, y, x, n and m are stoichiometric constants, R' and R" are either metals or carbon; accordingly, the corresponding $R'_nO''_{t-m}$ and R"O either are different metal suboxides which would have the effect of producing a mixed carbide or are carbon monoxide.

48. The method of claim 39 wherein the carbide whiskers are formed on the graphite material by passing a gaseous metal suboxide over the graphite material to be whiskerized while maintained under conditions for conducting the reaction:

$$tM_yO_x + R'_nR''_m = tM_yO_{(x-1)} + R'_nO_{t-m} + mR''O$$

where $M_yO_x$ is a standard metal oxide, R' and R" are reductants to reduce the metal oxide to suboxides, and t, y, x, n and m are stoichiometric constants, R' and R" are either metals or carbon; accordingly, the corresponding $R'_nO_{t-m}$ and R"O either are different metal suboxides which would have the effect of producing a mixed carbide or are carbon monoxide.

49. The method of claim 40 wherein the carbide whiskers are formed on the graphite material by passing a gaseous metal suboxide over the graphite material to be whiskerized while maintained under conditions for conducting the reaction:

$$tM_yO_x + R'_nR''_n = tM_yO_{(x-1)} + R'_nO_{t-m} + mR''O$$

where $M_yO_x$ is a standard metal oxide, R' and R" are reductants to reduce the metal oxide to suboxides, and t, y, x, n and m are stoichiometric constants, R' and R" are either metals or carbon; accordingly, the corresponding $R'_nO_{t-m}$ and R"O either are different metal suboxides which would have the effect of producing a mixed carbide or are carbon monoxide.

50. The method of claim 41 wherein the carbide whiskers are formed on the graphite material by passing a gaseous metal suboxide over the graphite material to be whiskerized while maintained under conditions for conducting the reaction:

$$tM_yO_x + R'_nR''_m = tM_yO_{(x-1)} + R'_nO_{t-m} + mR''O$$

where $M_yO_x$ is a standard metal oxide, R' and R" are reductants to reduce the metal oxide to suboxides, and t, y, x, n and m are stoichiometric constants, R' and R" are either metals or carbon; accordingly, the corresponding $R'_nO_{t-m}$ and R"O either are different metal suboxides which would have the effect of producing a mixed carbide or are carbon monoxide.

51. The method of claim 42 wherein the carbide whiskers are formed on the graphite material by passing a gaseous metal suboxide over the graphite material to be whiskerized while maintained under conditions for conducting the reaction:

$$tM_yO_x + R'_nR''_m = tM_yO_{(x-1)} + R'_nO_{t-m} + mR''O$$

where $M_yO_x$ is a standard metal oxide, R' and R" are reductants to reduce the metal oxide to suboxides, and t, y, x, n and m are stoichiometric constants, R' and R" are either metals or carbon; accordingly, the corresponding $R'_nO_{t-m}$ and R"O either are different metal suboxides which would have the effect of producing a mixed carbide or are carbon monoxide.

52. The method of claim 43 wherein the carbide whiskers are formed on the graphite material by passing a gaseous metal suboxide over the graphite material to be whiskerized while maintained under conditions for conducting the reaction:

$$tM_yO_x + R'_nR''_m = tM_yO_{(x-1)} + R'_nO_{t-m} + mR''O$$

where $M_yO_x$ is a standard metal oxide, R' and R" are reductants to reduce the metal oxide to suboxides, and t, y, x, n and m are stoichiometric constants, R' and R" are either metals or carbon, accordingly, the corresponding $R'_nO_{t-m}$ and R"O either are different metal suboxides which would have the effect of producing a mixed carbide or are carbon monoxide.

53. The method of claim 47 wherein the carbide whiskers are silicon carbide and the gaseous metal suboxide is gaseous silicon monoxide.

54. The method of claim 48 wherein the carbide whiskers are silicon carbide and the gaseous metal suboxide is gaseous silicon monoxide.

55. The method of claim 49 wherein the carbide whiskers are silicon carbide and the gaseous metal suboxide is gaseous silicon monoxide.

56. The method of claim 50 wherein the carbide whiskers are silicon carbide and the gaseous metal suboxide is gaseous silicon monoxide.

57. The method of claim 51 wherein the carbide whiskers are silicon carbide and the gaseous metal suboxide is gaseous silicon monoxide.

58. The method of claim 56 wherein the carbide whiskers are silicon carbide and the gaseous metal suboxide is gaseous silicon monoxide.

59. The method of claim 5 wherein the fabric comprising the reinforcement material is disposed in a two dimensional configuration.

60. The method of claim 5 wherein the fabric comprising the reinforcement material is disposed in a three dimensional configuration.

61. The method of claim 2 wherein the average diameter of the non crystalline carbon particulate is less than one-half of the average diameter of the reinforcement elements.

62. The method of claim 6 wherein the average diameter of the non crystalline carbon particulate is less than one-half of the average diameter of the reinforcement elements.

63. The method of claim 61 wherein the reinforcement elements are comprised of graphite.

64. The method of claim 62 wherein both the reinforcement elements and the fabric are comprised of graphite.

65. The method of claim 63 wherein the reinforcement elements have an average diameter of about 7 to 10 microns.

66. The method of claim 64 wherein the reinforcement elements have an average diameter of about 7 to 10 microns.

67. The method of claim 1 wherein the diameter of the non crystalline carbon particulate is not more than two microns.

68. The method of claim 27 wherein the diameter of the non crystalline carbon particulate is not more than two microns.

69. The method of claim 34 wherein the diameter of the non crystalline carbon particulate is not more than two microns.

70. The method of claim 31 wherein the diameter of the non crystalline carbon particulate is not more than two microns.

71. The method of claim 32 wherein the diameter of the non crystalline carbon particulate is not more than two microns.

72. The method of claim 34 wherein the diameter of the non crystalline carbon particulate is not more than two microns.

73. The method of claim 1 that further comprises subjecting the pyrolized carbon composite structure to chemical vapor infiltration, thereby reducing the porosity of the pyrolized carbon composite structure.

74. The method of claim 27 that further comprises comprises subjecting the pyrolized carbon composite structure to chemical vapor infiltration, thereby reducing the porosity of the pyrolized carbon composite structure.

75. The method of claim 30 that further comprises subjecting the pyrolized carbon composite structure to chemical vapor infiltration, thereby reducing the porosity of the pyrolized carbon composite structure.

76. The method of claim 31 that further comprises subjecting the pyrolized carbon composite structure to chemical vapor infiltration, thereby reducing the porosity of the pyrolized carbon composite structure.

77. The method of claim 32 that further comprises subjecting the pyrolized carbon composite structure to chemical vapor infiltration, thereby reducing the porosity of the pyrolized carbon composite structure.

78. The method of claim 34 that further comprises subjecting the pyrolized carbon composite structure to chemical vapor infiltration, thereby reducing the porosity of the pyrolized carbon composite structure.

79. The method of claim 38 that further comprises subjecting the pyrolized carbon composite structure to chemical vapor infiltration, thereby reducing the porosity of the pyrolized carbon composite structure.

80. The method of claim 41 that further comprises subjecting the pyrolized carbon composite structure to chemical vapor infiltration, thereby reducing the porosity of the pyrolized carbon composite structure.

81. The method of claim 42 that further comprises subjecting the pyrolized carbon composite structure to chemical vapor infiltration, thereby reducing the porosity of the pyrolized carbon composite structure.

82. The method of claim 43 that further comprises subjecting the pyrolized carbon composite structure to chemical vapor infiltration, thereby reducing the porosity of the pyrolized carbon composite structure.

83. The method of claim 45 that further comprises subjecting the pyrolized carbon composite structure to chemical vapor infiltration, thereby reducing the porosity of the pyrolized carbon composite structure.

84. The method of claim 32 that further comprises; infiltrating the pyrolized carbon composite structure with a hydrocarbon gas; and, isothermally pyrolizing the hydrocarbon gas while within the pyrolized carbon composite structure, thereby further reducing the porosity of the carbon composite structure.

* * * * *